United States Patent Office 2,994,635
Patented Aug. 1, 1961

2,994,635
FORTIFIED TALL OIL ROSIN PAPER SIZES
Eric T. Reaville, Webster Groves, Joseph P. O'Brien, Kirkwood, and Laurence P. Russe, St. Louis, Mo., assignors to Monsanto Chemical Company, St. Louis, Mo., a corporation of Delaware
No Drawing. Filed Dec. 13, 1957, Ser. No. 702,504
18 Claims. (Cl. 162—179)

This invention relates to new and improved fortified tall oil rosin sizes, to methods of producing the same, and to the manufacture of sized paper using these improved fortified tall oil rosin sizes.

Heretofore the principal rosins employed for the commercial manufacture of rosin paper sizes, including fortified rosin sizes, were wood rosin and gum rosin. There is a present trend toward decreased availability of wood and gum rosins, but there is also a trend toward increased availability of tall oil rosin, tall oil rosin being the rosin remaining after removal of fatty acids from tall oil by fractional distillation. These trends would indicate a desirability for the substitution of tall oil rosin for the gum and wood rosins now used for the preparation of fortified rosin paper sizes. However, mere substitution of tall oil rosin for wood rosin or gum rosin in known processes for the preparation of fortified rosin paper sizes has not met with success in the production of fortified rosin sizes that are usable by or satisfactory to the paper-sizing industry. More specifically, these attempts to produce a fortified tall oil rosin size have resulted in products which were unsatisfactory or unusable because of crystallization and a tendency to promote float during the paper-sizing operation. The products and methods of this invention not only overcome these problems and provide fortified tall oil rosin sizes of high sizing efficiency, but also provide tall oil rosin sizes of lower float and lower vscosity than were previously avaliable to the art, even when using the earlier-available sizes made from wood rosin and gum rosin.

The term "fortified rosin" is used herein to designate rosin containing a minor proportion of a Diels-Alder reaction product of one mol proportion of rosin (a commonly used empirical molecular weight for rosin being about 302) with up to one mol proportion of organic acidic compounds containing a —CO—C=C— group, including alpha-, beta-unsaturated polybasic organic acids and anhydrides such as maleic acid, maleic anhydride, fumaric acid, itaconic anhydride, citraconic acid, citraconic anhydride, etc. While rosin can theoretically react mol for mol with such a —CO—C=C— compound to form a Diels-Alder adduct, a fortified rosin generally represents only from about one-twentieth to about one-fifth of a mol of the —CO—C=C— compound per mol of rosin present. Thus, fortified rosin actually contains a major proportion of rosin and only a minor proportion of a Diels-Alder-rosin adduct. Such fortified rosins can be prepared in a number of ways. For example, the —CO—C=C— compound and the rosin can be heated and reacted in essentially the proportions which are desired in the final fortified rosin product, or one mol proportion of the rosin can be reacted with up to one mol proportion of the —CO—C=C— compound and the resulting adduct subsequently blended with a quantity of additional rosin sufficient to produce a fortified rosin representing the desired ratio of the —CO—C=C— compound to rosin. For use as a paper size, a fortified rosin is reacted or saponified with an aqueous alkali, such as by heating with an aqueous solution of sodium hydroxide, the resulting saponified product being referred to herein, as well as in the art, as "fortified rosin size."

Generally speaking, whether it be wood, gum or tall oil rosin, the constitutents of a rosin are rosin acids of the abietic type and neutral, i.e., non-acidic, materials. If the concentration of any single rosin in a rosin is high, there is a pronounced tendency for the rosin to crystallize. A rosin or rosin size which has such a tendency toward crystallization is referred to by the art as being "unstable."

Wood and gum rosins are old materials, and there are described in the art many methods and compounds to reduce or eliminate the tendency of these rosins to crystallize, i.e., methods to stabilize such rosins. Thus, two commerical methods of stabilizing gum and wood rosins are decarboxylation of the rosin to form rosin oil, sometimes called "abietine," and disproportionation, i.e., removal of two atoms of hydrogen from the two double-bond abietic-type acids and the rearrangement of the double-bond system to form an aromatic nucleus, giving compounds such as dehydroabietic acid. The hydrogen that is removed is readily absorbed by other two double-bond abietic-type acids present in rosin to produce the stable dihydroabietic acids and tetrahydroabietic acids.

With respect to tall oil rosin, neither of the two stabilizing methods described above is effective to stabilize tall oil rosin to the degree necessary for commercial use in high-quality paper sizes, nor to the degree necessary to produce fortified tall oil rosin sizes acceptable for the sizing of high-quality paper.

Basically, the factors which are determinative of the quality of rosin sizes (the term "rosin sizes" includes fortified rosin sizes) are (1) stability against crystallization, (2) sizing efficiency, (3) "float," and (4) viscosity. Stabilization against crystallization is important from a commercial standpoint for several reasons. If a rosin size crystallizes during shipment from manufacturer to consumer, or while stored by the consumer prior to use, the normal procedure would be, if possible, to remelt the size. However, in many instances, crystallized rosin size is so difficult to remelt that mechanical means of removal, such as chipping or digging, are required. Furthermore, when remelting of a rosin size is attempted, some unmelted crystals remain, which crystals cause difficulties in the paper-making process, as well as causing imperfections in the finished paper. The sizing efficiency of a rosin size is a term employed to indicate, on a relative basis, the quantity of size required to produce a given quality paper. "Float" is the term used to describe and measure an undesirable condition in the paper-making process where, due to characteristics, properties or composition of the size, the paper pulp tends to rise and float on the surface of the water instead of remaining as a substantially uniform dispersion. The viscosity of a rosin size is important in commercial use in that a low viscosity is desirable and facilitates handlng in the paper-making plant.

It is an object of this invention to provide a fortified tall oil rosin size having stability against crystallization, high sizing efficiency, lower float, and lower viscosity than was previously known to the art, and a method of making the same.

In broad terms, our improved fortified tall oil rosin size of the present invention is the product resulting from the combination of the following reaction steps:

(a) Reaction of a part of the tall oil rosin with formaldehyde,
(b) Reaction of a part of the tall oil rosin with fumaric acid to form a Diels-Alder adduct,
(c) Saponification of the mixture of reaction products from the above steps (a) and (b) by heating with an aqueous solution of an alkaline material.

To convert a given quantity of tall oil rosin to a fortified tall oil rosin size, it is necessary to carry out both reactions (a) and (b) described above, and it is preferred to effect reaction (a) first and thereafter effect reaction (b). While, in the alternative, these two reactions can be performed simultaneously or even in reverse order, i.e., effect reaction (b) first and thereafter effect reaction (a), the fortified tall oil rosin sizes produced by these alternative procedures are inferior to the fortified tall oil rosin sizes prepared by following the preferred procedure.

In view of the fact that the optimum temperatures for effecting reaction (a) are somewhat lower temperatures than the optimum temperatures for effecting reaction (b), reaction (a) is carried out first, whereby the tall oil rosin is first heated to the temperature required for the reaction with formaldehyde, and after this reaction is completed, the reaction mixture is then heated to somewhat higher temperatures for the Diels-Alder reaction with fumaric acid. When following an alternative procedure, that is, proceeding in the reverse order, the tall oil rosin-fumaric acid adduct is formed first, and thereafter the reaction mixture is cooled to the somewhat lower temperatures indicated for the reaction with formaldehyde. While it is preferable to effect the reaction of tall oil rosin with formaldehyde at somewhat lower temperatures than the temperatures for the reaction of tall oil rosin with fumaric acid, these reactions can both be effected at the same temperatures, and therefore both reactions can be carried out simultaneously. However, as pointed out above, it is preferred to effect the formaldehyde reaction first, and thereafter effect the Diels-Alder reaction with fumaric acid.

After a given quantity of tall oil rosin has been subjected to both reactions (a) and (b), the resulting mixture of reaction products at this point is herein referred to as a "fortified tall oil rosin" and contains a portion of unreacted tall oil rosin, a portion of tall oil rosin which has been reacted with formaldehyde, and a portion of tall oil rosin-fumaric acid adduct. This mixture of reaction products is then saponified by heating with an aqueous solution of an alkaline material, thereby producing a "fortified tall oil rosin size" which can be essentially neutral or which has a predetermined acid number.

The reaction between tall oil rosin and formaldehyde can be effected at temperatures from about 120° C. and higher, but at least above the softening point of the rosin, and preferably within the range of from about 140° C. to about 170° C. The tall oil rosin is heated to a temperature within this range, a catalytic quantity of acid catalyst is added, followed by the addition of from about ½% to about 8% by weight (based on the tall oil rosin) of formaldehyde, preferably as para-formaldehyde. The preferred amount of formaldehyde is about 2% to about 4% by weight. While the use of the higher amount of formaldehyde improves the ultimate fortified tall oil rosin size product with respect to stability against crystallization, the use of larger amounts of formaldehyde is at the sacrifice of the sizing efficiency of the ultimate fortified tall oil rosin sizes produced. The use of more than 8% by weight of formaldehyde reduces the sizing efficiency of the ultimate product below a satisfactory level for commercial usage. The acid catalyst used to promote the reaction between the tall oil rosin and the formaldehyde can be a strong mineral acid, such as hydrochloric acid, sulfuric acid or phosphoric acid; an aryl sulfonic acid, such as benzene sulfonic acid, naphthalene sulfonic acid or toluene sulfonic acid; a trihaloacetic acid, such as trichloroacetic acid or trifluoroacetic acid; a phosphonic acid, such as benzene phosphonic acid or toluene phosphonic acid; or borofluoric acid. The amount of the acid catalyst employed can be up to about 0.5 part per 100 parts by weight of rosin, but it is generally sufficient to use about 0.05 part to 0.3 part per 100 parts of rosin. Upon addition of the formaldehyde, a reaction commences, which reaction is completed in about 10 to 15 minutes. After the reaction with formaldehyde is essentially complete, step (b) is then effected; namely, a Diels-Alder reaction between a part of the tall oil rosin and fumaric acid. This reaction is effected at temperatures of about 120° C. and higher, but at least above the softening point, but generally not exceeding about 250° C., and preferably at about 200° C., the adduct formation generally being essentially complete in about 15 to 20 minutes at 200° C.

The amount of fumaric acid added to be reacted with the tall oil rosin can be from a small amount up to 10% or more by weight of tall oil rosin originally charged to the reactor; however, the use of fumaric acid above about 6% does not give any appreciable increase in sizing efficiency above that obtainable by the use of about 6% by weight of fumaric acid. Below about 6%, the efficiency of fortified tall oil rosin sizes diminishes with the use of lesser amounts of fumaric acid. Thus, in some instances, it may be acceptable to use 1% or 2%, the user accepting the diminished sizing efficiency. We have also found that the use of above about 6% fumaric acid increases the float to a degree which could, in some instances, cause operational difficulties in various steps of paper-making processes. We have further found that the use of about 4% fumaric acid effects a balance of properties, so that there is provided a fortified tall oil rosin size having a high sizing efficiency and very low float. In all cases, however, a fortified tall oil rosin size made by the method of this invention from tall oil rosin which has been adducted with fumaric acid will have a greater efficiency than a size adducted with, for example, maleic anhydride by methods previously known, and, furthermore, sizes prepared from a tall oil rosin-fumaric acid adduct will have a greatly reduced tendency to cause float than will a size prepared from a tall oil rosin-maleic anhydride adduct.

Generally, the float of sizes prepared from our fortified tall oil rosins is exceptionally low, but it must be remembered that the float is affected to some extent by the history of a particular lot of tall oil rosin, for example, the degree to which it has been refined, and this history is sometimes reflected by increased float value for the size. Therefore, in many instances, the float can be further reduced by steam sparging the mixture of reaction products from the reaction of the tall oil rosin with formaldehyde and fumaric acid. By steam sparging is meant the passing of steam into intimate contact with and through the mixture of reaction products. The usual way to determine whether steam sparging is desirable is to prepare a size from a small portion of the fortified tall oil rosin and determine the float, and generally the float will be of an acceptable low value. But, in the event that the float is higher than desired, the float can be reduced to a lower value by steam sparging the fortified tall oil rosin. To do so, the fortified tall oil rosin is heated to about 190° C. and steam sparging of the fortified tall oil rosin is then commenced while continuing to increase the temperature of the fortified tall oil rosin. When about 200° C. is reached, steam sparging is continued for about one-half to one hour while maintaining the temperature at about 200° to 220° C. The temperature at which steam sparging is commenced can be below or above 190° C.; for example, from about 160° C. to 250° C. is satisfactory. However, it has been found that about 200° C. to 220° C. is preferable, not for any reason associated with said sparging, but to minimize the inversion of the fumaric acid adduct to the maleic acid adduct, to minimize the inversion of fumaric acid to maleic acid, and to minimize decarboxylation and degradation of the rosin. An alternate treatment to steam sparging is to subject the fortified tall oil rosin to vacuum at about the same temperatures as employed for steam sparging.

In the practice of our invention, the fortified tall oil rosin is usually saponified with an aqueous alkali metal base solution containing a small amount, usually about ½% to 1.5% by weight, based on the amount of tall oil rosin, of alkali metal halide, and cooled. Although the alkali metal halide is not necessary for the saponification of the rosin to produce the size, the small amount added contributes materially to produce a size having a low viscosity. The alkali metal halide could be added before or after the saponification step, but one would find it difficult to dissolve the salt in the size after the saponification step.

As saponifying agents, there may be used alkali metal hydroxides, such as sodium and potassium hydroxide, and alkali metal carbonates, such as sodium and potassium carbonate. Saponification can be effected at temperatures from above the softening point of the fortified tall oil rosin to about 220° C., higher temperatures tending to promote decarboxylation, and temperatures below the softening point requiring special mixing equipment.

Alkali metal halides suitable for use in the method of this invention are the lithium, sodium and potassium chlorides, bromides, and iodides, preferably the potassium halides, and more preferably potassium chloride. The amount of alkali metal halide which can be used is from about ¼% or less to about 5% or more based upon the weight of tall oil rosin. However, the preferred range is from about ½% to about 1.5%, a smaller amount usually being insufficient to materially affect the viscosity, and a greater amount usually being unnecessary to effect the desired result or even to increase the viscosity.

Saponification of the partially fortified tall oil rosin can be performed by any of the general methods normally employed by the art; for example, the rosin can be added with hot caustic solution into a conventional cook tank, or the caustic solution can be stirred into the reaction product in the reaction vessel itself. Still alternatively, caustic solution can be mixed with solidified fortified rosin and the mixture heated. Neither the amount nor strength of the alkali metal base solution constitutes a part of this invention. The amount of caustic can be varied from an amount sufficient to produce a partially neutralized size, having an acid number up to about 30 and containing about 50% to 80% solids, preferred by paper manufacturers when the size is to be added directly into the heater, to an amount sufficient to provide a substantially completely neutralized size which would be preferred when the size is to be transported in dry form.

As a more specific illustration of the method of this invention, the following example is given. Parts are parts by weight unless otherwise stated.

EXAMPLE

To a suitable vessel, capable of withstanding superatmospheric pressure and having means for heating and cooling, there were charged 100 parts of tall oil rosin having an acid number of 170. Said rosin was heated to about 160° C., at which temperature there were added 2.2 parts of para-formaldehyde and 0.1 part of toluene sulfonic acid. The mixture was held at about 160° C. for about 20 minutes, followed by the addition of 4 parts of fumaric acid. At this point the mixture of the above reaction products is a fortified tall oil rosin. A small portion of this fortified tall oil rosin was saponified by heating with aqueous solution containing sufficient sodium hydroxide to provide a saponified product, i.e., a size, having an acid number of about 20. The float of the size thus prepared was equivalent to an A.S.F. value (hereinafter defined) of 30 and the sizing efficiency was determined to be 130%, thus showing the outstanding qualities of fortified tall oil rosin sizes which can be made by the practice of our invention. It will be recognized that a size having a float equivalent to an A.S.F. value of 30 is highly satisfactory for most all commercial paper-making operations. To show the further decrease in float which can be achieved without a loss of sizing efficiency, as hereinabove discussed, the fortified tall oil rosin prepared above was heated to about 190° C., at which temperature steam sparging was begun. When the temperature of the mass reached about 200° C., steam sparging was continued for about 45 minutes while maintaining the 200° C. temperature. The acid number of the fortified tall oil rosin was then determined to be 191. This fortified tall oil rosin was then saponified by heating, for a period of about one hour at about 150° C., with an aqueous solution containing one part of KCl and sufficient sodium hydroxide to provide a saponified product having an acid number of about 20. The product of this saponification had a viscosity at 45° C. of 14.3 poises and was essentially a paste containing about 70% solids. After the saponification was completed, the resulting fortified tall oil rosin size was cooled to room temperature. This size had an excellent sizing efficiency of 130, as compared to a fortified gum rosin size prepared from gum rosin and maleic anhydride and having an efficiency of 100. Furthermore, this size had excellent stability against crystallization, as shown by the fact that only a few first crystals formed after eight weeks' storage; on prolonged storage, no further crystal growth was evident. By contrast, a size prepared in identically the same manner, with the exception that the formaldehyde reaction step was omitted, was completely solid with crystals upon only one week's storage at the same conditions. The measured float of the steam sparged fortified tall oil rosin size prepared above was equivalent to an A.S.F. value of 11.

Although the published art has considered maleic anhydride and fumaric acid to be equivalent for the fortification of wood and gum rosins, we have found that the Diels-Alder adduct of tall oil rosin and fumaric acid is superior to an adduct of tall oil rosin and maleic anhydride in fortifying tall oil rosin and, furthermore, that a tall oil rosin size prepared by the process of our invention, containing a fumaric acid adduct, produces sizes having increased sizing efficiency and lower float than was previously possible using tall oil rosin.

In order to demonstrate the beneficial effect of the method of our invention upon the properties desired in a fortified rosin size, several comparative tests were made of sizes produced by the practice of our invention, as herein described, with sizes representative of the prior art.

The sizing efficiency of a fortified rosin size is of concern to the papermaker. A high sizing efficiency means that the papermaker can use less size to achieve a desired degree of sizing. There are several accepted types of tests for measuring the degree of sizing of a sample of paper, such as ink resistance and water penetration. The ink flotation test was used in comparing sizing efficiency of fortified tall oil rosin sizes produced by the method of this invention with sizes produced by methods known to the art, the reference size being a maleic anhydride fortified gum rosin size. Essentially, the ink flotation test involves placing a small boat of paper on ink and measuring the time required for the ink to penetrate the upper surface of the floating paper. Thus, if the paper is not sized, ink and water reach the top together; if sized, water moves up slowly, but the dye, more slowly. This test truly measures the degree of sizing and accurately predicts the performance of a sized paper (and thus the efficiency of a size when equal weights of various sizes are compared by sizing paper and then measuring ink penetration).

In Table I below are listed data showing the sizing efficiencies of fortified tall oil rosin sizes prepared with fumaric acid and with maleic anhydride, all other variables such as catalyst, amount of formaldehyde and reaction conditions being constant.

Table I

| Sample No. | Percent Fumaric | Percent Maleic | Sizing Efficiency, Percent | Average Sizing Efficiency, Percent |
|---|---|---|---|---|
| 1 | 4 | | 130 | |
| 2 | 4 | | 115 | |
| 3 | 4 | | 130 | 125 |
| 4 | 4 | | 125 | |
| 5 | | 4 | 84 | |
| 6 | | 4 | 90 | |
| 7 | | 4 | 80 | 83.5 |
| 8 | | 4 | 80 | |

A factor affecting the use of a size in a paper mill is the viscosity of the size. If a size has a high viscosity, difficulty is experienced in unloading tank cars containing size and in pumping size to storage or directly to where it is to be used. The viscosities of fortified tall oil rosin sizes prepared by the process of our invention will be lower than previously known fortified tall oil rosin sizes prepared, for example, from a rosin fortified with maleic anhydride. If, however, it appears that the viscosity of a fortified tall oil rosin size using a fortified tall oil rosin prepared by the method of our invention will be too high as determined by preparing a size from a small portion of said fortified tall oil rosin, we have found that the viscosity of the ultimate size can be further decreased by incorporating into the saponification step alkali metal halide, as hereinbefore discussed. In Table II, below, there are listed the results of viscosity tests made in order to demonstrate the low viscosity of our fortified tall oil rosin sizes as compared to those known to the art. Viscosity determinations were made with a Brookfield viscosimeter, Model HAT, No. 4 spindle.

Table II

| Fortifying Agent | Percent KCl | Percent NaCl | Viscosity (Poise) |
|---|---|---|---|
| Fumaric Acid | | | 59.7 |
| Do | | 0.5 | 35.3 |
| Do | 0.5 | | 26.5 |
| Maleic Anhydride | | | 113.5 |
| Do | | 0.5 | 89.8 |

Many techniques have been used in the laboratory to study the foaming and air stabilization tendencies in sizes, the effect of which is to cause "float;" that is, stable foam produced in a paper-making process causes the paper pulp to float on top of the water, thus disrupting said paper-making process. Briefly, the procedure used to compare the "float" of fortified tall oil rosin sizes made by the method of our invention with sizes known to the prior art was to refine standard bleached-sulfite pulp to a predetermined freeness, dilute to a standard consistency, and then aerate the mixture in an electric mixer. Size, and later alum, were added at exact times. After aeration, the slurry was transferred to a graduate and left to stand. The number of cc's of clear water under the floating pulp after sixteen hours was taken as a quantitative measure of the tendency of the size to cause air stabilization. The value is called an air stabilization factor (A.S.F.) or "float." A table of A.S.F. values is given below in Table III.

Table III

| A.S.F. | Rating |
|---|---|
| 0 to 25 | Excellent. Very low air stabilization. |
| 25 to 50 | Good. Seldom troublesome. |
| 50 to 75 | Fair. Troublesome on some machines. |
| 75 to 100 | Poor. Frequently troublesome. |

In Table IV, below, there are given the results of the "float" tests of fortified tall oil rosin sizes made by the method of our invention and the "float" of fortified sizes known to the art.

Table IV

| Sample No. | "Float" (A.S.F.) | Average "Float" |
|---|---|---|
| 1 | 10 | |
| 2 | 15 | |
| 3 | 15 | 12.5 |
| 4 | 10 | |
| 5 | 88 | |
| 6 | 49 | |
| 7 | 49 | 54.7 |
| 8 | 33 | |

In Table IV, samples 1 to 8 are the same samples used in Table I to show sizing efficiency.

From the foregoing it will be recognized that preparing a fortified tall oil rosin size by the method of our invention results in a size superior to previously known sizes produced from tall oil and is even superior to sizes heretofore produced from gum and wood rosin.

What is claimed is:

1. In a process for the preparation of a fortified tall oil rosin size, the steps comprising heating at temperatures above the softening point of the tall oil rosin, 100 parts by weight of tall oil rosin with from about 0.5 to about 8 parts by weight of formaldehyde and up to about 10 parts by weight of fumaric acid.

2. In a process for the preparation of a fortified tall oil rosin size, the steps comprising heating at temperatures above the softening point of the tall oil rosin, 100 parts by weight of tall oil rosin with from about 0.5 to about 8 parts by weight of formaldehyde and up to about 10 parts by weight of fumaric acid, and saponifying the reaction mixture from the formaldehyde and fumaric acid reactions.

3. In a process for the sizing of paper, the step comprising incorporating into paper pulp a fortified tall oil rosin prepared according to a method of claim 2.

4. In a process for the preparation of a fortified tall oil rosin size, the steps comprising (1) heating at temperatures above the softening point of tall oil rosin, 100 parts by weight of tall oil rosin with from about 0.5 to about 8 parts by weight of formaldehyde in the presence of an acid catalyst and up to about 10 parts by weight of fumaric acid, (2) steam sparging the mixture of reaction products from step (1) while maintaining said mixture at temperatures of from about 160° C. to about 250° C., and (3) saponifying the steam-sparged mixture of reaction products from step (2).

5. In a process for the preparation of a fortified tall oil rosin size, the steps comprising (1) heating at temperatures of from above the softening point of the tall oil rosin to about 170° C., 100 parts by weight of tall oil rosin with from about 0.5 to about 8 parts by weight of formaldehyde in the presence of an acid catalyst, (2) heating the reaction mixture from step (1) at temperatures of from above the softening point of the tall oil rosin to about 250° C. with up to about 10 parts by weight of fumaric acid, and (3) saponifying the mixture of reaction products from step (2) by heating said mixture with an aqueous alkaline solution, which solution contains up to about 5% of alkali metal halide.

6. In a process for the preparation of a fortified tall oil rosin size, the steps comprising (1) heating at temperatures of from about 140° C. to about 170° C., 100 parts by weight of tall oil rosin with from about 2 parts to about 4 parts by weight of para-formaldehyde and a catalytic quantity of aryl sulfonic acid, (2) heating the reaction mixture from step (1) at temperatures of from above the softening point of the tall oil rosin to about 250° C., with up to about 6 parts by weight of fumaric acid, (3) steam sparging the mixture of reaction products from step (2) while maintaining said mixture at temperatures of from about 190° C. to about 220° C., and (4) saponifying the steam-sparged mixture of reaction products from step (3) by heating said mixture with an aqueous caustic solution, which solution contains up to about 5% of alkali metal halide.

7. In a process for the sizing of paper, the step comprising incorporating into paper pulp a fortified tall oil rosin prepared according to a method of claim 6.

8. In a process for the preparation of a fortified tall oil rosin size, the steps comprising (1) heating at temperatures of from about 140° C. to about 170° C., 100 parts by weight of tall oil rosin with from about 2 to about 4 parts by weight of para-formaldehyde and a catalytic quantity of toluene sulfonic acid, (2) heating the reaction mixture from step (1) at temperatures of about 200° C. with about 4 parts by weight of fumaric acid, (3) steam sparging the mixture of reaction products from step (2) while maintaining said mixture at temperatures of from about 190° C. to about 220° C., and (4) saponifying the steam-sparged mixture of reaction products from step (3) by heating said mixture with an aqueous sodium hydroxide solution containing up to about 1.5% of potassium chloride.

9. In a process for the sizing of paper, the step comprising incorporating into an aqueous suspension of paper pulp a fortified tall oil rosin size prepared according to a method of claim 8.

10. In a process for the preparation of a tall oil rosin size, the steps comprising (1) heating at temperatures of from about 140° C. to about 170° C., 100 parts by weight of tall oil rosin with from about 2 to about 4 parts by weight of para-formaldehyde and a catalytic quantity of toluene sulfonic acid, (2) heating the reaction mixture from step (1) at temperatures of about 200° C. with about 4 parts by weight of fumaric acid, and (3) saponifying the reaction mixture from step (2) by heating said mixture with an aqueous sodium hydroxide solution containing up to about 1.5% potassium chloride.

11. In a process for the sizing of paper, the step comprising incorporating into an aqueous suspension of paper pulp a fortified tall oil rosin size prepared according to the method of claim 10.

12. In a process for the preparation of a tall oil rosin size, the steps comprising (1) heating at temperatures of from about 140° C. to about 170° C., 100 parts by weight of tall oil rosin with from about 2 to about 4 parts by weight of para-formaldehyde and a catalytic quantity of toluene sulfonic acid, (2) heating the reaction mixture from step (1) at temperatures of about 200° C. with about 4 parts by weight of fumaric acid, and (3) saponifying the reaction mixture from step (2) by heating said mixture with an aqueous caustic solution.

13. In a process for the sizing of paper, the step comprising incorporating into an aqueous suspension of paper pulp a fortified tall oil rosin prepared according to the method of claim 12.

14. In a process for the preparation of a fortified tall oil rosin size, the steps comprising (1) heating at temperatures of from about 140° C. to about 170° C., 100 parts by weight of tall oil rosin with from about 2 to about 4 parts by weight of para-formaldehyde and a catalytic quantity of toluene sulfonic acid, (2) heating the reaction mixture from step (1) at temperatures of about 200° C. with about 4 parts by weight of fumaric acid, (3) steam sparging the mixture of reation products from step (2) while maintaining said mixture at temperatures of from about 190° C. to about 220° C., and (4) saponifying the steam-sparged mixture of reaction products from step (3) by heating said mixture with an aqueous sodium hydroxide solution containing up to about 1.5% of sodium chloride.

15. In a process for the sizing of paper, the step comprising incorporating into an aqueous suspension of paper pulp a fortified tall oil rosin prepared according to the method of claim 14.

16. In a process for the preparation of a tall oil rosin size, the steps comprising (1) heating at temperatures of from about 140° C. to about 170° C., 100 parts by weight of tall oil rosin with from about 2 to about 4 parts by weight of para-formaldehyde and a catalytic quantity of toluene sulfonic acid, (2) heating the reaction mixture from step (1) at temperatures of about 200° C. with about 4 parts by weight of fumaric acid, and (3) saponifying the reaction mixture from step (2) by heating said mixture with an aqueous sodium hydroxide solution containing up to about 1.5% sodium chloride.

17. In a process for the sizing of paper, the step comprising incorporating into an aqueous suspension of paper pulp a fortified tall oil rosin prepared according to the method of claim 16.

18. In a process for the preparation of a fortified tall oil rosin size, the steps comprising (1) heating at temperatures above the softening point of the tall oil rosin, 100 parts by weight of tall oil rosin with from about 0.5 to about 8 parts by weight of formaldehyde and up to about 10 parts by weight of fumaric acid in the presence of a catalytic quantity of aryl sulfonic acid, and (2) steam sparging the mixture of reaction products from step (1) while maintaining said mixture at temperatures of from about 160° C. to about 250° C.

References Cited in the file of this patent

UNITED STATES PATENTS

| | | |
|---|---|---|
| 1,366,023 | Prince | Jan. 18, 1921 |
| 1,807,483 | Logan | May 26, 1931 |
| 2,299,312 | Drishfield | Oct. 20, 1942 |
| 2,309,346 | Landes et al. | Jan. 26, 1943 |
| 2,572,071 | St. Clair et al. | Oct. 23, 1951 |
| 2,628,918 | Wilson et al. | Feb. 17, 1953 |
| 2,659,718 | Eckhardt | Nov. 17, 1953 |
| 2,684,300 | Wilson et al. | July 20, 1954 |
| 2,720,514 | Rummelsburg | Oct. 11, 1955 |
| 2,721,504 | Mossberg | Oct. 25, 1955 |
| 2,771,464 | Hastings et al. | Nov. 30, 1956 |
| 2,776,275 | Strazdins | Jan. 1, 1957 |
| 2,872,315 | Watkins | Feb. 3, 1959 |
| 2,934,468 | Strazdins | Apr. 26, 1960 |

OTHER REFERENCES

Tattersfield article from the Journal Society Dyers and Colorists of January 1950, pp. 9, 10 and 11.

UNITED STATES PATENT OFFICE
CERTIFICATE OF CORRECTION

Patent No. 2,994,635            August 1, 1961

Eric T. Reaville et al.

It is hereby certified that error appears in the above numbered patent requiring correction and that the said Letters Patent should read as corrected below.

Column 2, line 3, after "rosin", first occurrence, insert -- acid --.

Signed and sealed this 9th day of January 1962.

(SEAL)
Attest:

ERNEST W. SWIDER            DAVID L. LADD
Attesting Officer            Commissioner of Patents